United States Patent
Jia et al.

(10) Patent No.: US 10,783,371 B2
(45) Date of Patent: Sep. 22, 2020

(54) GABOR CUBE FEATURE SELECTION-BASED CLASSIFICATION METHOD AND SYSTEM FOR HYPERSPECTRAL REMOTE SENSING IMAGES

(71) Applicant: SHENZHEN UNIVERSITY, Shenzhen, Guangdong (CN)

(72) Inventors: Sen Jia, Guangdong (CN); Jie Hu, Guangdong (CN); Yao Xie, Guangdong (CN); Linlin Shen, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 182 days.

(21) Appl. No.: 15/980,701

(22) Filed: May 15, 2018

(65) Prior Publication Data
US 2018/0268195 A1    Sep. 20, 2018

Related U.S. Application Data

(63) Continuation of application No. PCT/CN2016/104659, filed on Nov. 4, 2016.

(30) Foreign Application Priority Data

Jan. 27, 2016   (CN) .......................... 2016 1 0055913

(51) Int. Cl.
*G06K 9/00*   (2006.01)
*G06K 9/62*   (2006.01)
(Continued)

(52) U.S. Cl.
CPC ........... *G06K 9/0063* (2013.01); *G06F 17/18* (2013.01); *G06K 9/00201* (2013.01); *G06K 9/46* (2013.01);
(Continued)

(58) Field of Classification Search
CPC .. G06K 9/0063; G06K 9/4619; G06K 9/6234; G06K 9/6228; G06K 9/6267;
(Continued)

(56) References Cited

FOREIGN PATENT DOCUMENTS

CN    102156872 A  *  8/2011

OTHER PUBLICATIONS

Shen, Linlin, and Sen Jia. "Three-dimensional Gabor wavelets for pixel-based hyperspectral imagery classification." IEEE Transactions on Geoscience and Remote Sensing 49.12 (2011): 5039-5046. (Year: 2011).*

(Continued)

*Primary Examiner* — Amandeep Saini (57) ABSTRACT

The present invention provides a Gabor cube feature selection-based classification method for hyperspectral remote sensing images, comprising the following steps: generating three-dimensional Gabor filters according to set frequency and direction parameter values; convoluting hyperspectral remote sensing images with the three-dimensional Gabor filters to obtain three-dimensional Gabor features; selecting three-dimensional Gabor features, classification contribution degrees to various classes of which meet preset requirements, from the three-dimensional Gabor features; and classifying the hyperspectral remote sensing images by a multi-task joint sparse representation-based classification means by using the selected three-dimensional Gabor features. The present invention is based on the three-dimensional Gabor features, and the used three-dimensional Gabor features contain rich local change information of a signal and are competent in feature characterizing. Using a Fisher discriminant criterion not only makes full use of high-level semantics hidden among the features, but also eliminates redundant information and reduces the classification time complexity.

8 Claims, 4 Drawing Sheets

(51) Int. Cl.
*G06K 9/46* (2006.01)
*G06F 17/18* (2006.01)

(52) U.S. Cl.
CPC ......... *G06K 9/4619* (2013.01); *G06K 9/6228* (2013.01); *G06K 9/6234* (2013.01); *G06K 9/6267* (2013.01); *G06K 2009/00644* (2013.01); *G06K 2009/4657* (2013.01)

(58) Field of Classification Search
CPC ............... G06K 9/46; G06K 9/00201; G06K 2009/4657; G06K 2009/00644; G06K 9/6271; G06F 17/18
USPC ....................................................... 382/181
See application file for complete search history.

(56) References Cited

OTHER PUBLICATIONS

Bau, Tien C., Subhadip Sarkar, and Glenn Healey. "Hyperspectral region classification using a three-dimensional Gabor filterbank." IEEE Transactions on Geoscience and Remote Sensing 48.9 (2010): 3457-3464. (Year: 2010).*

Xiao-Tong Yuan et al., Visual Classification With Multi-task Joint Sparse Representation, IEEE Conference on Computer Vision and Pattern Recognition, Jun. 2010, pp. 3493-3500.

Jiayi Li et al., Joint Collaborative Representation With Multitask Learning for Hyperspectral Image Classification, IEEE Transactions on Geoscience and Remote Sensing, Sep. 2014, pp. 5923-5936, vol. 52, No. 9.

\* cited by examiner

GABOR CUBE FEATURE SELECTION-BASED CLASSIFICATION METHOD AND SYSTEM FOR HYPERSPECTRAL REMOTE SENSING IMAGES

CROSS REFERENCE TO RELATED APPLICATIONS

The present application is a Continuation Application of PCT application No. PCT/CN2016/104659 filed on Nov. 4, 2016, which claims the benefits of Chinese Patent Application No. 201610055913.2 filed on Jan. 27, 2016. The contents of all of the above are hereby incorporated by reference.

TECHNICAL FIELD

The present invention belongs to the field of data classification, particularly relates to a Gabor cube feature selection-based and multi-task joint sparse representation-based classification method and system for hyperspectral remote sensing images.

BACKGROUND

Hyperspectral remote sensing images are multi-spectral image data obtained from a ground object of interest by remote sensors within visible, near-infrared, mid-infrared and thermal infrared bands of electromagnetic spectrums. The hyperspectral remote sensing images contain rich spatial, radiation and spectral triplex information, which exhibits a better effect in classifying the ground objects. A conventional classification method directly classifies the hyperspectral remote sensing images by using commonly used classifiers (a K-nearest neighbor, a support vector machine), which may not meet an actual classification effect. In view of a fact that the hyperspectral remote sensing images have spatial and spectral three-dimensional structures, there are rich signal change information facilitating classification hidden among pixels, techniques of performing the classification in combination with the spatial information and the spectral information of the hyperspectral remote sensing images are gradually developed. At present, methods of performing classification in combination with the spatial information and the spectral information mainly include two methods, one is to separately use the spatial information and the spectral information, extract two-dimensional spatial features of each spectrum by using a two-dimensional spatial filter, and then perform the classification by using a classifier, wherein information of the features obtained by this method is insufficient, such that information hidden between the spatial information and the spectral information is not fully utilized; and the other one is to fuse the spatial information and the spectral information, filter the hyperspectral remote sensing images by using the three-dimensional filter (3D-Gabor) to obtain joint features containing rich spatial and spectral three-dimensional structure information, and perform the classification by using the joint features, wherein information of the features extracted by this method is rich, such that the classification accuracy is improved. However, the features extracted by this method only reflect properties of a certain aspect of the data, and can not accurately reflect essential properties of the data in the hyperspectral remote sensing images.

In the prior art, a multi-task classification means is used to classify the hyperspectral remote sensing images. At present, such a multi-task classification technique has achieved some scientific research results. YUAN [X.-T. Yuan and S. Yan, "Visual classification with multi-task joint sparse representation," in IEEE Conference on Computer Vision and Pattern Recognition (CVPR), June 2010, pp. 3493-3500] proposed a multi-task joint sparse representation classification method by combining multiple tasks with sparse representations. The method extracts color, shape and texture features from the images respectively, then fuses these three kinds of features in a linear combination manner to obtain new color, shape and texture features with more competent characterizing, and finally performs the classification by using multi-task joint sparse representation. The method fuses the features before classifying them, and such a linear fusion may produce a lot of redundant information; and meanwhile, the extracted features are not suitable for linear fusion because the extracted features are completely different in properties.

LI [J. Li, H. Zhang, L. Zhang, X. Huang, and L. Zhang, "Joint collaborative representation with multi-task learning for hyperspectral image classification," IEEE Trans. Geosci. Remote Sens., vol. 52, no. 9, pp. 5923-5936, 2014.] proposed a multi-task collaborative representation classification method. The method extracts four kinds of features of spectrum, gradient, wavelet texture and shape from original hyperspectral remote sensing images, and then respectively uses collaborative representation to code and reconstruct them to obtain reconstruction errors of the features, and then fuses the reconstruction errors of the four kinds of features in a linear weighting manner. Finally, perform the classification by using the fused reconstruction errors. The method fuses the features at a classification stage, although the classification accuracy is improved, weighting coefficients in a process of fusing the reconstruction errors are difficult to determine. Moreover, when there are less training samples, coefficients for collaborative coding have no unique solution and are not suitable for small sample classification.

SUMMARY

A technical problem to be solved by the present invention is to provide a Gabor cube feature selection-based classification method and system for hyperspectral remote sensing images, aiming to solve problems that a large number of redundant information which is not conducive to classification is produced, the classification accuracy is reduced and the classification time complexity is improved when the hyperspectral remote sensing images are classified in the prior art.

The present invention is achieved by a Gabor cube feature selection-based classification method for hyperspectral remote sensing images, comprising the following steps:

A, generating a number of three-dimensional Gabor filters according to set frequency and direction parameter values;

B, convoluting hyperspectral remote sensing images with the generated three-dimensional Gabor filters to obtain a number of three-dimensional Gabor features;

C, selecting a number of three-dimensional Gabor features, classification contribution degrees to various classes of which meet preset requirements, from the obtained three-dimensional Gabor features; and D, classifying the hyperspectral remote sensing images by a multi-task joint sparse representation-based classification means by using the selected three-dimensional Gabor features.

The present invention further provides a Gabor cube feature selection-based classification system for hyperspectral remote sensing images, comprising:

a generation unit, which is configured to generate a number of three-dimensional Gabor filters according to set frequency and direction parameter values;

a calculation unit, which is configured to convolute hyperspectral remote sensing images with the generated three-dimensional Gabor filters to obtain a number of three-dimensional Gabor features;

a selection unit, which is configured to select a number of three-dimensional Gabor features, classification contribution degrees to various classes of which meet preset requirements, from the obtained three-dimensional Gabor features; and a classification unit, which is configured to classify the hyperspectral remote sensing images by a multi-task joint sparse representation-based classification means by using the selected three-dimensional Gabor features.

Compared with the prior art, the present invention has the beneficial effects that the present invention is based on the three-dimensional Gabor features, and the used three-dimensional Gabor features contain rich local change information and are competent in feature characterizing. Using a Fisher discriminant criterion not only makes full use of high-level semantics hidden among the features, but also eliminates redundant information and reduces the classification time complexity. Further, using sparse coding, combining the three-dimensional Gabor features with multiple tasks, the classification accuracy is greatly improved.

DESCRIPTION OF THE EMBODIMENTS

In order to make objects, technical solution and advantages of the present invention be more apparent, the present invention will be described in further detail with reference to accompanying drawings and embodiments. It should be understood that specific embodiments described herein are merely illustrative of the present invention and are not intended to limit the present invention.

The present invention relates to a technique for classifying ground objects by utilizing hyperspectral remote sensing images. The hyperspectral remote sensing images are multi-spectral image data obtained from a ground object of interest by remote sensors within visible, near-infrared, mid-infrared and thermal infrared bands of electromagnetic spectrums. The hyperspectral remote sensing images contain rich spatial, radiation and spectral triplex information, which exhibits a better effect in classifying the ground objects.

Recently, a sparse representation-based classification (SRC) method exhibits a better effect in classifying the hyperspectral remote sensing images. The SRC performs sparse coding on test samples by using training samples, and then reconstructs the test samples by using the resulted coding coefficients to obtain residual errors for each class. The class with the smallest residual error serves as the class to which the test samples belong. The core concept of the SRC is that only samples in the same class can be represented with each other. Since the SRC classifies errors of each class by reconstructing the test samples and the reconstruction errors on multiple features may be superposed, a multi-task classification means using SRC on multiple features is proposed, which is called a multi-task joint sparse representation-based classification (MTJSRC) method for short. The method performs sparse representation on the test samples by using multiple features, then reconstruct original test samples by using the resulted sparse coding, then accumulates the reconstruction errors of each feature, and finally selects the class with minimal accumulated reconstruction errors as the class of the test samples. The method combines multiple features well at a stage of accumulating the reconstruction errors, and discriminates the class attribute by the accumulated reconstruction errors of the multiple features, thereby improving the robustness of classifying the reconstruction errors and obtaining better classification effect. The MTJSRC is successfully applied in face recognition, video tracking, disease diagnosis and other fields. Inspired by the MTJSRC, a multi-task joint collaborative representation-based classification (MTJCRC) method is proposed, which performs collaborative representation (CRC) on the test samples by using the training samples, and carries out similar superposition on the obtained collaborative coding coefficients and the sparse coding coefficients in the MTJSRC for classification. The core point of the collaborative representation is that the entire training sample set has a characterizing capacity for the test samples. The method uses multiple features, and improves the classification accuracy.

The key to the multi-task classification means is how to efficiently and adequately use rich classification information provided by the multiple features. One method is to firstly fuse the multiple features, extract a group of features with more competent feature characterizing. Feature fusion may be performed in the classification process, or before the classification. The other method is to select a more representative feature from the original features. Whether it is feature fusion or feature selection, the redundant information among the multiple features should be able to be eliminated, and factors that are not conducive to the classification should be able to be removed, to make the features more characterizing.

Figure 1:
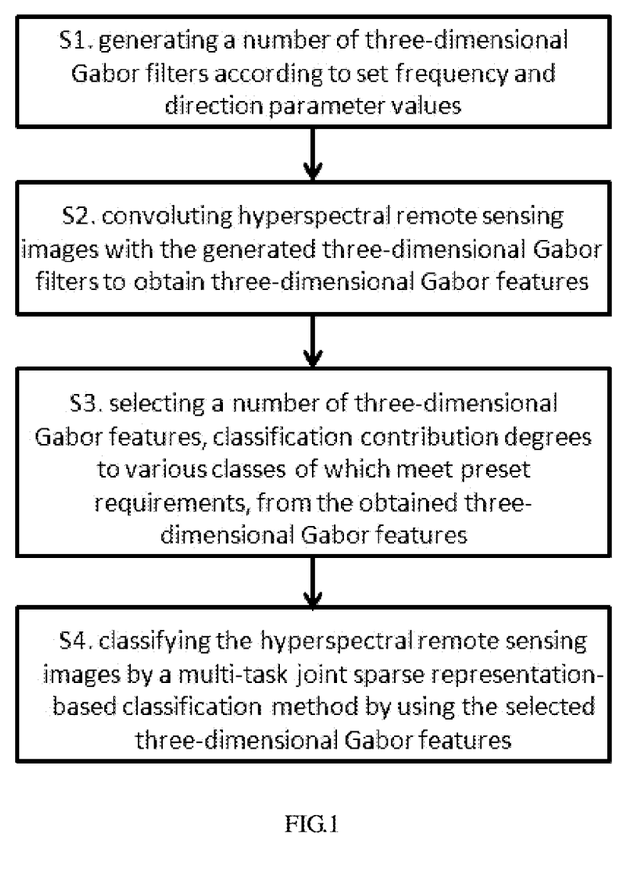
FIG. 1 is a flow chart of a Gabor cube feature selection-based classification method for hyperspectral remote sensing images provided by an embodiment of the present invention.

Based on the above-mentioned theory, the present invention proposes a Gabor cube feature selection-based classification (GS-MTJSRC) method for hyperspectral remote sensing images as shown in FIG. 1, comprising the following steps:

S1, generating a number of three-dimensional Gabor filters according to set frequency and direction parameter values;

S2, convoluting hyperspectral remote sensing images to be classified with the generated three-dimensional Gabor filters to obtain a number of three-dimensional Gabor features;

S3, selecting a number of three-dimensional Gabor features, classification contribution degrees to various classes of which meet preset requirements, from the obtained three-dimensional Gabor features; and S4, classifying the hyperspectral remote sensing images by a multi-task joint sparse representation-based classification means by using the selected three-dimensional Gabor features.

The present invention will be further described below with reference to FIG. 2 to FIG. 5.

Figure 2:
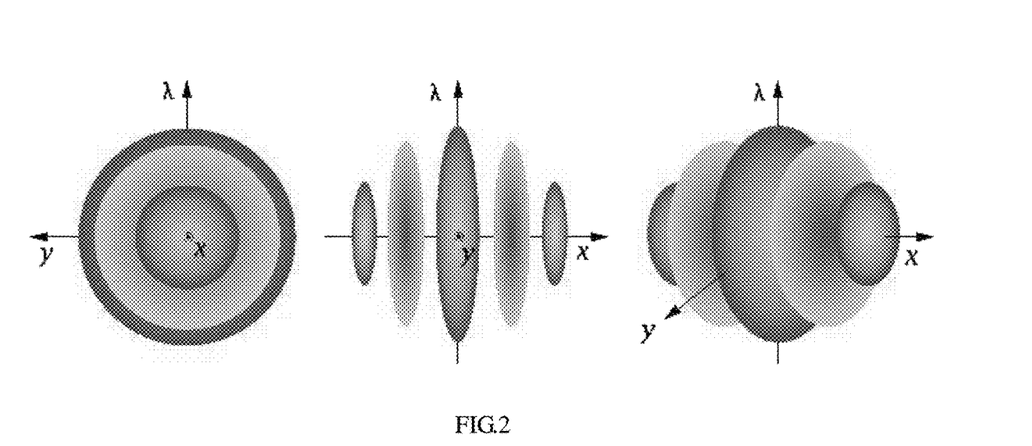
FIG. 2 shows a three-dimensional Gabor filter provided by an embodiment of the present invention, viewed from three different aspects.

The step S1 particularly comprising:

S11, setting frequency and direction parameter values, and then generating 64 three-dimensional Gabor filters according to the set parameter values;

$f_t$ represents a frequency, $\{\varphi_k, \theta_j\}$ represents a direction, then the frequency is set as follows: $f_t=[0.5, 0.25, 0.125, 0.0625]$, 16 directions are set as follows: $\{\varphi_k, \theta_j\}=[0, \pi/4, \pi/2, 3\pi/4]$, and then 64 three-dimensional Gabor filters are generated according to a formula $$\Psi_{f,\varphi,\theta}(x, y, \lambda) = \frac{1}{(2\pi)^{2/3}\sigma^3} \exp(j2\pi(xu + yv + \lambda w)) \times \exp\left(-\frac{x^2 + y^2 + \lambda^2}{2\sigma^2}\right),$$

wherein $u = f \sin\varphi \cos\theta$, $v = f \sin\varphi \sin\theta$, $w = f \cos\varphi$; $\varphi$ represents an included angle between a filter image and a $\omega$ axis, $\theta$ represents an included angle between the filter and $\mu$-$v$ plane; $\varphi_k$ represents a $k^{th}$ value of the $\varphi$, $\theta_j$ represents a $j^{th}$ value of the $\theta$; $(x, y, \lambda)$ respectively represents an x coordinate, a y coordinate and a spectrum coordinate of a pixel; $\sigma$ represents a width of a Gaussian envelope;

S12, removing 8 repeated filters in the 64 three-dimensional Gabor filters, wherein the remaining 52 filters serve as final three-dimensional Gabor filters and are represented by $\{\Psi_i, i=1, \ldots, 52\}$.

As shown in FIG. 2, a three-dimensional Gabor filter of one $[f=1, \varphi=0, \theta=0]$ in spatial and spectral domains is shown from three different perspectives.

Figure 3:
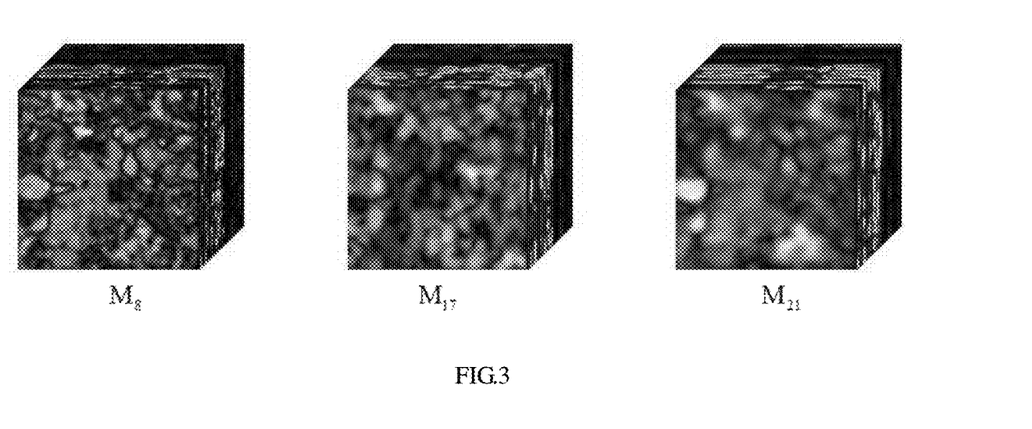
FIG. 3 shows three three-dimensional Gabor features with different frequencies and directions parameter values provided by an embodiment of the present invention.

The step S2 particularly comprising:

S21, convoluting the hyperspectral remote sensing images with the 52 three-dimensional Gabor filters;

S22, calculating amplitude from a result of convolution operation to obtain 52 three-dimensional Gabor features;

R represents the hyperspectral remote sensing images, and $M_t$ represents the generated $t^{th}$ three-dimensional Gabor feature, then a calculating amplitude is represented as $M_t(x, y, \lambda) = |(R \otimes \Psi_t)(x, y, \lambda)|$;

the 52 three-dimensional Gabor features are represented as $\{M_t, t=1, \ldots, 52\}$. FIG. 3 shows three three-dimensional Gabor features $M_8$, $M_{17}$ and $M_{21}$ with different frequencies and directions.

The step S3 selecting three-dimensional Gabor features by utilizing a Fisher discriminant criterion, particularly comprising:

S31, dividing each of the three-dimensional Gabor feature into a training set and a test set;

$A^t$ represents a training set of the $t^{th}$ three-dimensional Gabor feature $M_1$, $G^t$ represents a test set of the $t^{th}$ three-dimensional Gabor feature $M_t$, here $t \in \{1, \ldots, 52\}$, and therefore all training sets $\{A^t, t=1, \ldots, 52\}$ and test sets $\{G^t, t=1, \ldots, 52\}$ of the 52 three-dimensional Gabor features may be obtained;

S32, respectively calculating an intra-class spacing and an inter-class spacing of each three-dimensional Gabor feature by using the training set ($A^t$, $t=1, \ldots, 52$;

it will be illustrated by taking the $t^{th}$ three-dimensional Gabor feature as an example. $\gamma_W(A_p^t)$ represents an intra-class spacing of a $p^{th}$ class in the $t^{th}$ three-dimensional Gabor feature, and $\gamma_B(A_p^t)$ represents an inter-class spacing of the $p^{th}$ class in the $t^{th}$ three-dimensional Gabor feature, then:

$$\gamma_W(A_p^t) = \sum_{\alpha_i \in A_p^t} (\alpha_i - m_p^t)^T (\alpha_i - m_p^t)$$

$$\gamma_B(A_p^t) = n_p (m_p^t - m^t)^T (m_p^t - m^t)$$

wherein $A_p^t$ represents a training set of the $p^{th}$ class of the training sets $A^t$, more particularly, $A^t = [A_1^t, \ldots, A_p^t]$, $\alpha_i$ represents one training sample in $A_p^t$. $n_p$ represents the number of the samples in the $p^{th}$ class, $p \in \{1, \ldots, P\}$, P represents the number of the classes; $m^t$ and $m_p^t$ respectively represent mean vectors $$m^t = \frac{1}{n} \sum_{\alpha_i \in A^t} \alpha_i \text{ and } m_p^t = \frac{1}{n_p} \sum_{\alpha_i \in A_p^t} \alpha_i$$

of $A^t$ and $A_p^t$;

S33, calculating Fisher scores of the classes in the 52 three-dimensional Gabor features by using the intra-class spacing and the inter-class spacing calculated in the last step;

the Fisher scores of the classes in the 52 three-dimensional Gabor features are stored by using a matrix F (F $\in \mathbb{R}^{52 \times P}$), $F_p^t$ represents a Fisher score of the $p^{th}$ class in the $t^{th}$ three-dimensional Gabor feature, then:

$$F_p^t = \gamma_B(A_p^t)/\gamma_W(A_p^t)$$

wherein $F \in \mathbb{R}^{52 \times P}$, P represents the number of the classes, specifically, $F_p^t$ represents elements in a $t^{th}$ line and a $p^{th}$ column of the matrix F;

S34, selecting V elements with higher Fisher scores from each column of the matrix F, and storing indexes of the selected elements in a preliminary index matrix S, wherein $S \in \mathbb{R}^{V \times P}$; repeated indexes in the preliminary index matrix are removed to obtain final indexes, and the finally indexes are stored in a index matrix I, $I \in \mathbb{R}^{K \times 1}$; and no repeated indexes exist in the index matrix I, and each index points to a specific three-dimensional Gabor feature. It can thus be seen that K three-dimensional Gabor features are selected from the 52 three-dimensional Gabor features.

Figure 4:
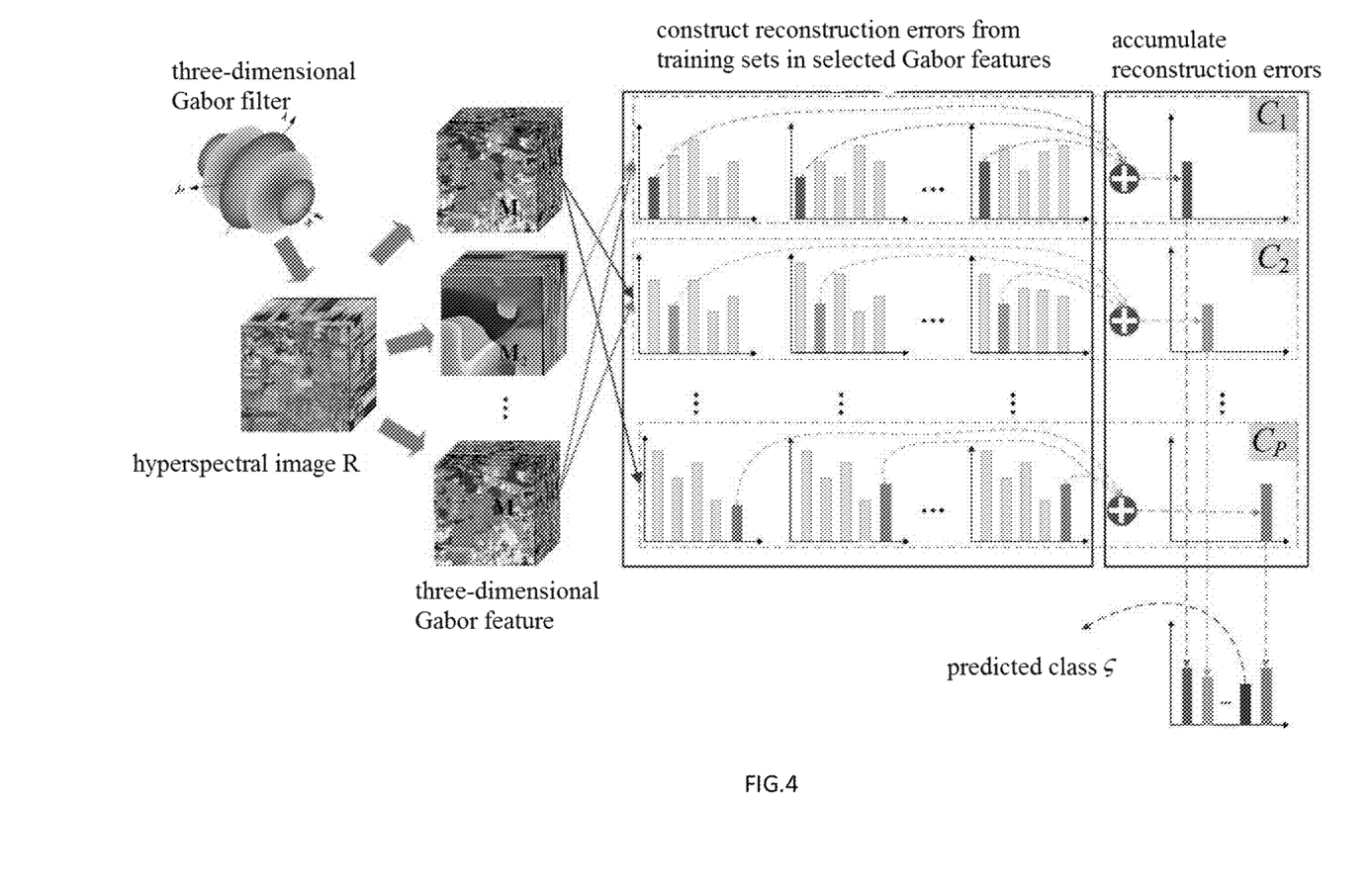
FIG. 4 illustrates a detailed process for classifying test samples provided by an embodiment of the present invention.

The step S4, classifying the hyperspectral remote sensing images by a multi-task joint sparse representation-based classification means by using the Gabor features selected in the above step. Particularly comprising the following steps:

S41, dividing each selected three-dimensional Gabor feature into a training set and a test set;

$\{A^{I(k)}, k=1, \ldots, K\}$ represents training sets corresponding to the K three-dimensional Gabor features, and $\{G^{I(k)}, k=1, \ldots, K\}$ represents corresponding test sets;

S42, calculating sparse coding coefficients of three-dimensional Gabor features of test samples in the test sets on the training sets;

g represents one test sample in the test sets, and the K three-dimensional Gabor features corresponding to it are represented as $\{g^{I(k)}, k=1, \ldots, K\}$, and if the sparse coding coefficients of the K three-dimensional Gabor features $\{g^{I(k)}, k=1, \ldots, K\}$ of the test sample on the training sets $\{A^k, k=1, \ldots, K\}$ are respectively represented as $\{\alpha^k, k=1, \ldots, K\}$, then:

$$\{\alpha^k\} = \underset{k=\{1,\ldots K\}}{\arg\min}\{\|g^{I(k)} - A^{I(k)}\alpha^k\|_2^2 + \eta\|\alpha^k\|_1\};$$

wherein $\alpha^k$ represents any one vector which is identical to a dimension of $\alpha^k$; and $\eta$ represents a coefficient of a $L_1$ norm;

S43, respectively reconstructing $\{g^{I(k)}, k=1, \ldots, K\}$ according to the preliminary index matrix S by using the sparse coding coefficients $\{\alpha^k, k=1, \ldots, K\}$ and the training sets $\{A^{I(k)}, k=1, \ldots, K\}$ to obtain K reconstruction errors and accumulating them, wherein a class with minimal accumulated reconstruction errors serves as the class of the test sample g; and $\varsigma$ represents a class predicted for the test sample g, then:

$$\varsigma = \underset{p\in\{1,\ldots,P\}}{\arg\min} \sum_{i=S(1,p)}^{S(V,p)} \|g^i - A_p^i\alpha_p^i\|_2^2;$$

wherein $\alpha_p^k$ represents a coefficient corresponding to the $p^{th}$ class in the sparse coding coefficients $\alpha^k$ corresponding to the selected $k^{th}$ three-dimensional Gabor feature $g^k$; and the final index matrix I is obtained by removing the repeated indexes in the preliminary index matrix S, thus in the above formula, $i\in\{I(k), k=1, \ldots, K\}$. FIG. 4 shows a detailed process for classifying test sample g.

Figure 5:
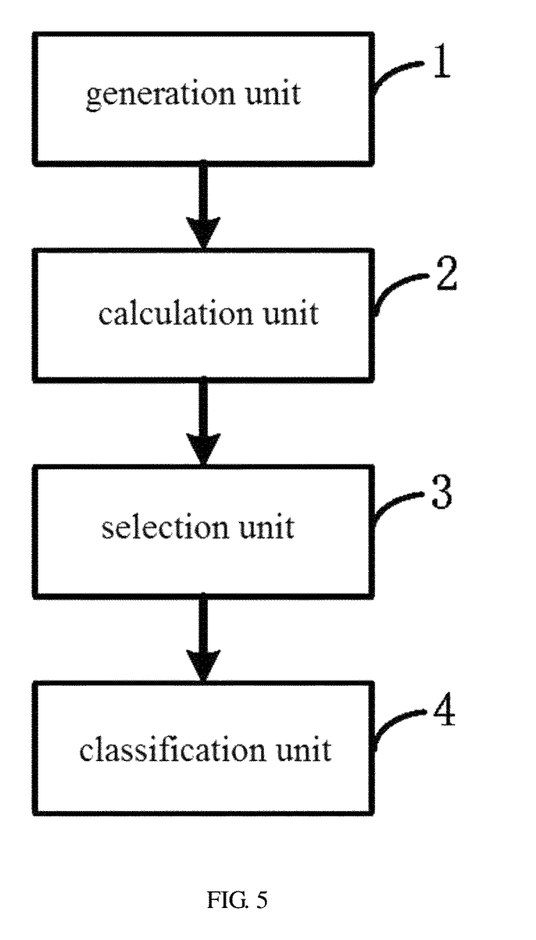
FIG. 5 is a schematic diagram of a Gabor cube feature selection-based classification system for hyperspectral remote sensing images provided by an embodiment of the present invention.

The present invention further provides a Gabor cube feature selection-based classification system for hyperspectral remote sensing images as shown in FIG. 5, comprising:

a generation unit 1, which is configured to generate a number of three-dimensional Gabor filters according to set frequency and direction parameter values;

a calculation unit 2, which is configured to convolute hyperspectral remote sensing images with the generated three-dimensional Gabor filters to obtain a number of three-dimensional Gabor features;

a selection unit 3, which is configured to select a number of three-dimensional Gabor features, classification contribution degrees to various classes of which meet preset requirements, from the obtained three-dimensional Gabor features; and a classification unit 4, which is configured to classify the hyperspectral remote sensing images by a multi-task joint sparse representation-based classification means by using the selected three-dimensional Gabor features.

Further, the generation unit 1 is particularly configured to:

firstly, set frequency and direction parameter values, and then generate 64 three-dimensional Gabor filters according to the set parameter values;

$f_t$ represents a frequency, $\{\varphi_k, \theta_j\}$ represents a direction, then the frequency is set as follows: $f_t=[0.5,0.25,0.125,0.0625]$, 16 directions are set as follows: $\{\varphi_k,\theta_j\}=[0,\pi/4,\pi/2,3\pi/4]$.

then the 64 three-dimensional Gabor filters are generated according to a formula $$\Psi_{f,\varphi,\theta}(x, y, \lambda) = \frac{1}{(2\pi)^{2/3}\sigma^3}\exp(j2\pi(xu + yv + \lambda w)) \times \exp\left(-\frac{x^2 + y^2 + \lambda^2}{2\sigma^2}\right),$$

wherein $u=f\sin\varphi\cos\theta, v=f\sin\varphi\sin\theta, w=f\cos\varphi$; u, v, w correspond to three coordinate axes in a three-dimensional space; $\varphi$ represents an included angle between a filter image and a $\omega$ axis, $\theta$ represents an included angle between the filter and $\mu$–$\nu$ plane; $\varphi_k$ represents a $k^{th}$ value of the $\varphi$, $\theta_j$ represents a $j^{th}$ value of the $\theta$, (x, y, $\lambda$) respectively represents an x coordinate, a y coordinate and a spectrum coordinate of a pixel; $\sigma$ represents a width of a Gaussian envelope;

finally, remove 8 repeated filters in the 64 three-dimensional Gabor filters, wherein the remaining 52 filters serve as final three-dimensional Gabor filters and are represented by $\{\Psi_i, i=1, \ldots, 52\}$.

The calculation unit 2 is particularly configured to:

firstly, convolute hyperspectral remote sensing images with the generated 52 three-dimensional Gabor filters; and then calculate amplitude from a result of convolution operation to obtain 52 three-dimensional Gabor features;

R represents the hyperspectral remote sensing images, and $M_t$ represents the generated $t^{th}$ three-dimensional Gabor feature, then the calculating amplitude is represented as $M_t(x,y,\lambda)=|(R\otimes\Psi_t)(x,y,\lambda)|$, here, $t\in\{1,\ldots,52\}$, and thus, 52 three-dimensional Gabor features may be obtained, and represented by $\{M_t, t=1, \ldots, 52\}$.

The selection unit 3 selects three-dimensional Gabor features by utilizing a Fisher discriminant criterion, with particular steps as follows:

firstly, dividing each of the three-dimensional Gabor feature into a training set and a test set;

$A^t$ represents a training set of the $t^{th}$ three-dimensional Gabor feature $M_t$, $G^t$ represents a test set of the $t^{th}$ three-dimensional Gabor feature $M_t$, here $t\in\{1, \ldots, 52\}$, and therefore all training sets $\{A^t, t=1, \ldots, 52\}$ and test sets $\{G^t, t=1, \ldots, 52\}$ of the 52 three-dimensional Gabor features may be obtained;

then, respectively calculating an intra-class spacing and an inter-class spacing of each three-dimensional Gabor feature by using the training set $\{A^t, t=1, \ldots, 52\}$;

it will be illustrated by taking the $t^{th}$ three-dimensional Gabor feature as an example, $\gamma^W(A_p^t)$ represents an intra-class spacing of a $p^{th}$ class in the $t^{th}$ three-dimensional Gabor feature, and $\gamma_B(A_p^t)$ represents an inter-class spacing of the $p^{th}$ class in the $t^{th}$ three-dimensional Gabor feature, then:

$$\gamma_W(A_p^t) = \sum_{\alpha_i \in A_p^t}(\alpha_i - m_p^t)^T(\alpha_i - m_p^t)$$

$$\gamma_B(A_p^t) = n_p(m_p^t - m^t)^T(m_p^t - m^t)$$

wherein $A_p^t$ represents a training set of the $p^{th}$ class of the training sets $A_p^t$, more particularly, $A^t=[A_1^t, \ldots, A_p^t]$, $\alpha_i$ represents one training sample in $A_p^t$. $n_p$ represents the number of the samples in the $p^{th}$ class, $p\in\{1, \ldots, P\}$, P represents the number of the classes; $m^t$ and $m_p^t$ respectively represent mean vectors $$m^t = \frac{1}{n}\sum_{\alpha_i \in A^t} \alpha_i \text{ and } m_p^t = \frac{1}{n_p}\sum_{\alpha_i \in A_p^t} \alpha_i$$

of $A^t$ and $A_p^t$;

finally, calculating Fisher scores of the classes in the 52 three-dimensional Gabor features by using the intra-class spacing and the inter-class spacing calculated in the last step;

the Fisher scores of the classes in the 52 three-dimensional Gabor features are stored by using a matrix F (F∈

$\mathbb{R}^{52\times P}$), $F_p^t$ represents a Fisher score of the $p^{th}$ class in the $t^{th}$ three-dimensional Gabor feature, then:

$$F_p^t = \gamma_B(A_p^t)/\gamma_W(A_p^t);$$

wherein $F \in \mathbb{R}^{52\times P}$, P represents the number of the classes, actually, $F_p^t$ represents elements in a $t^{th}$ line and a $p^{th}$ column of the matrix F;

finally, selecting V elements with higher scores from each column of the matrix F, and storing indexes of the selected elements in a preliminary index matrix, wherein $S \in \mathbb{R}^{V\times P}$; repeated indexes in the preliminary index matrix are removed to obtain finally-selected indexes, and the finally-selected indexes are stored in a index matrix I, $I \in \mathbb{R}^{K\times 1}$; and no repeated indexes exists in the index matrix L and each index points to a specific three-dimensional Gabor feature. It can thus be seen that K three-dimensional Gabor features are selected from the 52 three-dimensional Gabor features.

The classification unit 4 performs classification by a multi-task joint sparse representation-based classification means by using the three-dimensional Gabor features selected in the above steps, with particular steps as follows:

firstly, dividing each selected three-dimensional Gabor feature into a training set and a test set;

$\{A^{I(k)}, k=1, \ldots, K\}$ represents training sets corresponding to the K three-dimensional Gabor features, and $\{G^{I(k)}, k=1, \ldots, K\}$ represents corresponding test sets;

then, calculating sparse coding coefficients of three-dimensional Gabor features of test samples in the test sets on the training sets;

g represents one test sample, and the K three-dimensional Gabor features corresponding to it are represented as $\{g^{I(k)}, k=1, \ldots, K\}$, and if the sparse coding coefficients of the K three-dimensional Gabor features $\{g^{I(k)}, k=1, \ldots, K\}$ of the test sample on the training sets $\{A^k, k=1, \ldots, K\}$ are respectively represented as $\{\alpha^k, k=1, \ldots, K\}$, then:

$$\{\alpha^k\} = \underset{k=[1,\ldots K]}{\arg\min}\{\|g^{I(k)} - A^{I(k)}\alpha^k\|_2^2 + \eta\|\alpha^k\|_1\};$$

wherein $\alpha^k$ represents any one vector which is identical to a dimension of $\alpha^k$ and $\eta$ represents a coefficient of a $L_1$ norm;

finally, respectively reconstructing $\{g^{I(k)}, k=1, \ldots, K\}$ according to the preliminary index matrix S by using the sparse coding coefficients $\{\alpha^k, k=1, \ldots, K\}$ and the training sets $\{A^{I(k)}, k=1, \ldots, K\}$ to obtain K reconstruction errors and accumulating them, wherein a class with minimal accumulated reconstruction errors serves as the class of the test sample g; and $\varsigma$ represents a class predicted for the test sample g, then:

$$\varsigma = \underset{p \in [1,\ldots,P]}{\arg\min} \sum_{i=S(1,p)}^{S(V,p)} \|g^i - A_p^i \alpha_p^i\|_2^2$$

wherein $\alpha_p^k$ represents a coefficient corresponding to the $p^{th}$ class in the sparse coding coefficients $\alpha^k$ corresponding to the selected $k^{th}$ three-dimensional Gabor feature $g^k$; and the final index matrix I is obtained by removing the repeated indexes in the preliminary index matrix S, and thus in the above formula, $i \in \{I(k), k=1, \ldots, K\}$.

Compared with the prior art, the present invention can bring the following beneficial effects:

1, in view of the shortcoming that the prior art is not suitable for linear fusion due to large property difference in color, shape and textural features, the present invention adopts three-dimensional Gabor features suitable for fusion, and the used three-dimensional Gabor features contain rich local change information of a signal, and are competent in characterizing, 2, in view of the shortcoming that information which is not conducive to the classification is produced in a feature fusion process, the present invention selects less three-dimensional Gabor features which are more characterizing for each class by using a Fisher discriminant criterion, not only makes full use of high-level semantics hidden among the features, but also eliminates redundant information, and reduces the classification time complexity;

3, in view of the shortcoming that a weighting coefficient of fusing the reconstruction errors of collaborative representation is difficult to determine, the three-dimensional Gabor features selected by the Fisher discriminant criterion are more competent in the feature characterizing in the present invention, without learning weights to fuse;

4, in view of the shortcoming that training a sample covariance matrix on small samples by a collaborative representation method is irreversible, the present invention uses the sparse coding, so that there is no problem that the classification accuracy of the small samples is reduced due to unstable coding coefficients.

Experiments showed that the present invention may obtain higher classification accuracy than the conventional multi-task classification means. The experiments used three true hyperspectral datasets. The first dataset was obtained by a visible/infrared imaging spectrometer sensor at the Kennedy Space Center (KSC), Florida, on Mar. 23, 1996. The dataset has original 224 bands, 48 bands are removed due to water absorption and low signal-to-noise ratio, and the remaining 176 bands are reserved. Each band has an image size of 421×444. The KSC dataset consists of 13 classes of ground objects, containing 5211 labeled samples. The second dataset was pictured and captured by a ROSIS-03 sensor at the Pavia University (PaviaU), Italy. The dataset remained 103 bands after 12 noise bands were removed. Each band had a size of 610×340 and a spatial resolution of 1.3 m/pixel. There were 42,776 labeled samples in the dataset, a total of 9 classes of ground objects. The third dataset was pictured and captured by the National Science Foundation Funding Center at the Houston University and its surrounding region, Houston, on Jun. 23, 2012, by using airborne laser mapping. The dataset has 144 bands, each band has an image size of 349×1905 and a spatial resolution of 2.5 m/pixel. There were 15,029 labeled samples in the dataset, a total of 15 classes of ground objects.

In the experiment process, the three-dimensional Gabor features of each data set were extracted firstly, and then the three-dimensional Gabor features with more competent characterizing were selected from these features. The selected three-dimensional Gabor features were divided into training sets with sizes of 3, 5, 10, 15, 20 for each class, and the remaining three-dimensional Gabor features were corresponding test sets. In order to demonstrate the validity of the present invention, the classification accuracy of the present invention is compared with the accuracy of the conventional method. Experimental results show that the classification accuracy of the present invention is much higher than that of the conventional method. By taking the KSC dataset as an example, the classification accuracy of the MTJSRC-GS reaches 92.48% when each class has 3 training samples, while the classification accuracy of the conventional MTJCRC is 83.70% and the classification accuracy of the MTJSRC is 89.34%.

Particularly, in an actual use process:

Types of the filters may be adjusted in the step S1, for instance, a three-dimensional Log-Gabor filter; and frequency and angle parameters of the three-dimensional Gabor filters can also be adjusted;

a three-dimensional Gabor feature selection method in the step S3 may be replaced by other methods, and the number of the selected three-dimensional Gabor features may also be adjusted; and a classification (SRC) method in the step S4 may be replaced by other methods, for instance, CRC.

The foregoing is merely illustrative of preferred embodiments of the present invention and is not intended to limit the present invention, and any modifications, equivalent substitutions and improvements within the spirit and principles of the present invention are intended to be encompassed within a protective scope of the present invention.

What is claimed is:

1. A Gabor cube feature selection-based classification method for hyperspectral remote sensing images, the classification method for hyperspectral remote sensing images comprising the following steps:

A, generating a number of three-dimensional Gabor filters according to set frequency and direction parameter values;

B, convoluting hyperspectral remote sensing images with the generated three-dimensional Gabor filters to obtain a number of three-dimensional Gabor features;

C, selecting a number of three-dimensional Gabor features, classification contribution degrees to various classes of which meet preset requirements, from the obtained three-dimensional Gabor features; and D, classifying the hyperspectral remote sensing images by a multi-task joint sparse representation-based classification means by using the selected three-dimensional Gabor features;

wherein R represents the hyperspectral remote sensing images, 52 three-dimensional Gabor features obtained by the hyperspectral remote sensing images R participating in convolution operation are represented by $\{M_t, t=1, \ldots, 52\}$, wherein $M_1$ represents a $t^{th}$ three-dimensional Gabor feature;

the step C of selecting three-dimensional Gabor features by utilizing a Fisher discriminant criterion, particularly comprising:

C1, dividing each of the three-dimensional Gabor feature into a training set and a test set;

$A^t$ represents a training set of the $t^{th}$ three-dimensional Gabor feature $M_t$, $G^t$ represents a test set of $t^{th}$ three-dimensional Gabor feature $M_t$, $t \in \{1, \ldots, 52\}$, and therefore all training sets $\{A^t, t=1, \ldots, 52\}$ and test sets $\{G^t, t=1, \ldots, 52\}$ of the 52 three-dimensional Gabor features are obtained;

step C2, respectively calculating an intra-class spacing and an inter-class spacing of each three-dimensional Gabor feature by using the training set $\{A^t, t=1, \ldots, 52\}$;

$\gamma_W(A_p^t)$ represents an intra-class spacing of a $p^t$ class in the $t^{th}$ three-dimensional Gabor feature, and $\gamma_B(A_p^t)$ represents an inter-class spacing of the $p^{th}$ class in the $t^h$ three-dimensional Gabor feature, then:

$$\gamma_W(A_p^t) = \sum_{\alpha=A_p^t} (\alpha_i - m_p^t)^T (\alpha_i - m_p^t)$$

$$\gamma_B(A_p^t) = n_p (m_p^t - m^t)^T (m_p^t - m^t);$$

wherein $A_p^t$ represents a training set of the $p^{th}$ class of the training sets $A^t$, $A^t=[A_1^t, \ldots, A_p^t]$, $\alpha_1$ represents one training sample in $A_p^t$; $n_p$ represents the number of the samples in the $p^{th}$ class $p \in \{1, \ldots, P\}$ represents the number of the classes; $m^t$ and $m_p^t$ respectively represent mean vectors $$m^t = \frac{1}{n} \sum_{\alpha_i \in A^t} \alpha_i \text{ and } m_p^t = \frac{1}{n_p} \sum_{\alpha_i \in A_p^t} \alpha_i \text{ of } A^t \text{ and } A_p^t;$$

step C3, calculating Fisher scores of the classes in the 52 three-dimensional Gabor features by using the intra-class spacing and the inter-class spacing calculated in the step C2:

the Fisher scores of the classes in the 52 three-dimensional Gabor features are stored by using a matrix F ($F \in \mathbb{R}^{52 \times P}$, represents a Fisher score of the $p^{th}$ class in the $t^{th}$ three-dimensional Gabor feature, then:

$$F_p^T = \gamma_B(A_p^t) / \gamma_W(A_p^t);$$

wherein $F \in \mathbb{R}^{52 \times P}$, P represents the number of the classes, $F_p^t$ represents elements in a $t^{th}$ and a $p^{th}$ column of the matrix F;

step C4, selecting V elements with higher scores from each column of the matrix F, and storing indexes of the selected elements in a preliminary index matrix, removing repeated indexes in the preliminary index matrix to obtain a final index matrix, and determining three-dimensional Gabor features to be selected according to the index matrix;

S represents the preliminary index matrix, I represents the final index matrix, the V elements with higher Fisher scores are selected from each column of the matrix F, and the index of the selected elements are stored in the preliminary index matrix S, $S \in \mathbb{R}^{V \times P}$; the repeated indexes in the preliminary index matrix S are removed to obtain finally-selected indexes, the finally-selected indexes are stored in the index martix I, $I \in \mathbb{R}^{K \times 1}$; and no repeated indexes exist in the indes matrix I, and eah index points to a specific three-dimensional Gabor feature.

2. The classification method for hyperspectral remote sensing images according to claim 1, wherein the step A particularly comprises:

step A1, generating 64 three-dimensional Gabor filters according to the set frequency and direction parameter values;

$f_t$ represents a frequency, $\{\varphi_k, \theta_j\}$ represents a direction, then the frequency is set as follows: $f_t=[0.5, 0.25, 0.125, 0.0625]$, 16 directions are set as follows: $\{\varphi_k, \theta_j\}=[0, \pi/4, \pi/2, 3\pi/4]$, and then the 64 three-dimensional Gabor filters are generated according to a formula $$\Psi_{f\varphi,\theta}(x, y, \lambda) = \frac{1}{(2\pi)^{2/3} \sigma^3} \exp(j2\pi(xu + yv + \lambda w)) \times \exp\left(-\frac{x^2 + y^2 + \lambda^2}{2\sigma^2}\right),$$

wherein u=f sin φ cos θ, v=f sin φ sin θ, w=f cos φ; φ represents an included angle between the filter and a ω axis, θ represents an included angle between the filter and a μ–v plane; φ$_k$ represents a k$^{th}$ value of the φ, θ$_j$ represents a j$^{th}$ value of the θ; (x, y, λ) respectively represents an x coordinate, a y coordinate and a spectrum coordinate of a pixel; σ represents a width of a Gaussian envelope; and step A2, removing 8 repeated three-dimensional Gabor filters in the 64 three-dimensional Gabor filters, wherein the remaining 52 three-dimensional Gabor filters serve as three-dimensional Gabor filters participating in subsequent convolution operation and are represented by {Ψ$_i$, i=1, . . . , 52}.

3. The classification method for hyperspectral remote sensing images according to claim 1, wherein there are 52 generated three-dimensional Gabor filters, which are represented by {Ψ$_i$, i=1, . . . , 52}; and the step B particularly comprises:

step B1, convoluting hyperspectral remote sensing images with the 52 three-dimensional Gabor filters; and step B2, calculating amplitude from a result of convolution operation to obtain 52 three-dimensional Gabor features of the hyperspectral remote sensing images;

R represents the hyperspectral remote sensing images, and M$_t$ represents a generated t$^{th}$ three-dimensional Gabor feature, then the calculating amplitude is represented as M$_t$(x,y,λ)=|(R⊗Ψ$_t$)(x,y,λ)|; the generated 52 three-dimensional Gabor features are represented as {M$_t$, t=1, . . . , 52}, wherein (x,y,λ) respectively represents an x coordinate, a y coordinate and a spectrum coordinate.

4. The classification method for hyperspectral remote sensing images according to claim 1, wherein indexes of K three-dimensional Gabor features selected in the step C are stored in the index matrix I; and the step D particularly comprises:

step D1, dividing each selected three-dimensional Gabor feature into a training set and a test set;

{A$^{I(k)}$, k=1, . . . , K} represents training sets corresponding to the K three-dimensional Gabor features, and {G$^{I(k)}$, k=1, . . . , K} represents corresponding test sets;

step D2, calculating sparse coding coefficients of three-dimensional Gabor features of test samples on the training sets;

g represents one test sample in the test sets, and the K three-dimensional Gabor features corresponding to it are represented as {g$^{I(k)}$, k=1, . . . , K}, and if the sparse coding coefficients of the K three-dimensional Gabor features {g$^{I(k)}$, k=1, . . . , K} of the test sample on the training sets {A$^k$, k=1, . . . , K} are respectively represented as {α$^k$, k=1, . . . , K}, then:

$$\{\alpha^k\} = \underset{k=\{1,\ldots K\}}{\arg\min}\{\|g^{I(k)} - A^{I(k)}\alpha^k\|_2^2 + \eta\|\alpha^k\|_1\};$$

wherein α$^k$ represents any one vector which is identical to a dimension of α$^k$; and η represents a coefficient of a L$_1$ norm;

step D3, respectively reconstructing {g$^{I(k)}$, k=1, . . . , K} according to the preliminary index matrix S by using the sparse coding coefficients {α$^k$, k=1, . . . , K} and the training sets {A$^{I(k)}$, k=1, . . . , K} to obtain K reconstruction errors and accumulating them, wherein a class with minimal accumulated reconstruction errors serves as the class of the test sample g; and ζ represents a class predicted for the test sample g, then:

$$\zeta = \underset{p\in\{1,\ldots,P\}}{\arg\min} \sum_{i=S(1,p)}^{S(V,p)} \|g^i - A_p^i \alpha_p^i\|_2^2;$$

wherein α$_p^k$ represents a coefficient corresponding to the p$^{th}$ class in the sparse coding coefficients α$^k$ corresponding to the selected k$^{th}$ three-dimensional Gabor feature g$^k$; and the index matrix I is obtained by removing the repeated indexes from the preliminary index matrix S, then i∈{I(k), k=1, . . . , K}.

5. A Gabor cube feature selection-based classification system for hyperspectral remote sensing images, wherein the classification system for hyperspectral remote sensing images comprises:

a generation unit, which is configured to generate a number of three-dimensional Gabor filters according to set frequency and direction parameter values;

a calculation unit, which is configured to convolute hyperspectral remote sensing images with the generated three-dimensional Gabor filters to obtain a number of three-dimensional Gabor features;

a selection unit, which is configured to select a number of three-dimensional Gabor features, classification contribution degrees to various classes of which meet preset requirements, from the obtained three-dimensional Gabor features; and a classification unit, which is configured to classify the hyperspectral remote sensing images by a multi-task joint sparse representation-based classification means by using the selected three-dimensional Gabor features;

wherein the generation unit is particulary configured to:

firstly, set frequency and direction parameter values, and then generate 64 three-dimensional Gabor filters according to the set values;

f$_t$ represents a frequency, {φ$_k$, θ$_j$} represents a direction, then the frequency is set as follows:

f$_t$=[0.5, 0.25, 0.125, 0.0625], 16 directions are set as follows: {φ$_k$, θ$_j$}=[0, π/4, π/2,3π/4], and the 64 three-dimensional Gabor filters are generated according to a formula $$\Psi_{f,\phi,\theta}(x, y, \lambda) = \frac{1}{(2\pi)^{2/3}\sigma^3} \exp(j2\pi(xu + yv - \lambda w)) \times \exp\left(-\frac{x^2 + y^2 + \lambda^2}{2\sigma^2}\right),$$

wherein u=f sin φcos θ, v=f sin φsin θ, w=f cos φ; φrepresents an included angle between a filter and a ω axis, φ represents an included angle between the filter and a u–v plane; φ$_k$ represents a k$^{th}$ value of the φ, θ$_j$ represents a j$^{th}$ value of the θ; (x,y,λ) respectively represents an x coordinate, a y coordinate and a spectrum coordinate of a pixel; σ represents a width of a Gaussian envelope; and finally, remove 8 repeated three-dimensional Gabor filters in the 64 three-dimensional Gabor filters, wherein the remaining 52 three-dimensional Gabor filters serve as three-dimensional Gabor filters participating in subsequent convolution operation and are represented by {Ψ$_i$,i=1, . . . , 52}.

6. The classification system for hyperspectral remote sensing images according to claim 5, wherein there are 52 three-dimensional Gabor filters, which are represented by {Ψ$_i$, i=1, . . . , 52};

the calculation unit is particularly configured to:
firstly, convolute hyperspectral remote sensing images with the generated 52 three-dimensional Gabor filters; and
then calculate amplitude from a result of convolution operation to obtain 52 three-dimensional Gabor features of the hyperspectral remote sensing images;
R represents the hyperspectral remote sensing images, and $M_t$ represents the generated $t^{th}$ three-dimensional Gabor feature, then:
the calculating amplitude is represented as $M_t(x,y,\lambda)=|(R \otimes \Psi_t)(x,y,\lambda)|$; the generated 52 three-dimensional Gabor features are represented as $\{M_t, t=1, \ldots, 52\}$, wherein $(x,y,\lambda)$ respectively represents an x coordinate, a y coordinate and a spectrum coordinate.

7. The classification system for hyperspectral remote sensing images according to claim 5, wherein R represents the hyperspectral remote sensing images, 52 three-dimensional Gabor features obtained by the hyperspectral remote sensing images R participating in convolution operation are represented by $\{M_t, t=1, \ldots, 52\}$, wherein $M_t$ represents a $t^{th}$ three-dimensional Gabor feature;
the selection unit selects three-dimensional Gabor features by utilizing a Fisher discriminant criterion, with particular steps as follows:
firstly, dividing each of the three-dimensional Gabor feature into a training set and a test set;
$A^t$ represents a training set of the $t^{th}$ three-dimensional Gabor feature $M_t$, $G^t$ represents a test set of the $t^{th}$ three-dimensional Gabor feature $M_t$, $t \in \{1, \ldots, 52\}$, and therefore all training sets $\{A^t, t=1, \ldots, 52\}$ and test sets $\{G^t, t=1, \ldots, 52\}$ of the 52 three-dimensional Gabor features are obtained;
then, respectively calculating an intra-class spacing and an inter-class spacing of each three-dimensional Gabor feature by using the training set $\{A^t, t=1, \ldots, 52\}$;
$\gamma_W(A_p^t)$ represents an intra-class spacing of a $p^{th}$ class in the $t^{th}$ three-dimensional Gabor feature, and $\gamma_B(A_p^t)$ represents an inter-class spacing of the $p^{th}$ class in the $t^{th}$ three-dimensional Gabor feature, then:

$$\gamma_W(A_p^t) = \sum_{\alpha_i \in A_p^t} (\alpha_i - m_p^t)^T (\alpha_i - m_p^t)$$
$$\gamma_B(A_p^t) = n_p(m_p^t - m^t)^T (m_p^t - m^t);$$

wherein $A_p^t$ represents a training set of the $p^{th}$ class of the training sets $A^t$, $A^t = [A_1^t, \ldots, A_p^t]$, $\alpha_i$ represents one training sample in $A_p^t$; $n_p$ represents the number of the samples in the $p^{th}$ class, $p \in \{1, \ldots, P\}$, P represents the number of the classes; $m^t$ and $m_p^t$ respectively represent mean vectors $$m^t = \frac{1}{n} \sum_{\alpha_i \in A^t} \alpha_i \text{ and } m_p^t = \frac{1}{n_p} \sum_{\alpha_i \in A_p^t} \alpha_i$$

of $A^t$ and $A_p^t$;
then, calculating Fisher scores of the classes in the 52 three-dimensional Gabor features by using the calculated intra-class spacing and the calculated inter-class spacing;
the Fisher scores of the classes in the 52 three-dimensional Gabor features are stored by using a matrix F ($F \in \mathbb{R}^{52 \times P}$), $F_p^t$ represents a Fisher score of the $p^{th}$ class in the $t^{th}$ three-dimensional Gabor feature, then:

$$F_p^t = \gamma_B(A_p^t)/\gamma_W(A_p^t);$$

wherein $F \in \mathbb{R}^{52 \times P}$, P represents the number of the classes, and $F_p^t$ represents elements in a $t^{th}$ line and a $p^{th}$ column of the matrix F;
finally, selecting V elements with higher scores from each column of the matrix F, and storing indexes of the selected elements in a preliminary index matrix, removing repeated indexes in the preliminary index matrix to obtain a final index matrix, and determining three-dimensional Gabor features to be selected according to the index matrix;
S represents the preliminary index matrix, I represents a final index matrix, the V elements with higher Fisher scores are selected from each column of the matrix F, and the index of the selected elements are stored in the preliminary index matrix S, $S \in \mathbb{R}^{V \times P}$; the repeated indexes in the preliminary index matrix S are removed to obtain finally-selected indexes, the finally-selected indexes are stored in the index matrix I, $I \in \mathbb{R}^{K \times 1}$; and no repeated indexes exist in the index matrix I, and each index points to a specific three-dimensional Gabor feature.

8. The classification system for hyperspectral remote sensing images according to claim 7, wherein the classification unit is particularly configured to:
firstly, divide each selected three-dimensional Gabor feature into a training set and a test set;
$\{A^{I(k)}, k=1, \ldots, K\}$ represents training sets corresponding to the K three-dimensional Gabor features, and $\{G^{I(k)}, k=1, \ldots, K\}$ represents corresponding test sets;
then, calculate sparse coding coefficients of three-dimensional Gabor features of test samples on the training sets;
g represents one test sample, and the K three-dimensional Gabor features corresponding to it are represented as $\{g^{I(k)}, k=1, \ldots, K\}$, and if the sparse coding coefficients of the K three-dimensional Gabor features $\{g^{I(k)}, k=1, \ldots, K\}$ of the test sample on the training sets $\{A^k, k=1, \ldots, K\}$ are respectively represented as $\{\alpha^k, k=1, \ldots, K\}$, then:

$$\{\alpha^k\} = \underset{k=\{1, \ldots K\}}{\arg\min} \{\|g^{I(k)} - A^{I(k)} \alpha^k\|_2^2 + \eta \|\alpha^k\|_1\}$$

wherein $\alpha^k$ represents any one vector which is identical to a dimension of $\alpha^k$; and $\eta$ represents a coefficient of a $L_1$ norm;
finally, respectively reconstruct $\{g^{I(k)}, k=1, \ldots, K\}$ according to the preliminary index matrix S by using the sparse coding coefficients $\{\alpha^k, k=1, \ldots, K\}$ and the training sets $\{A^{I(k)}, k=1, \ldots, K\}$ to obtain K reconstruction errors and accumulate them, wherein a class with minimal accumulated reconstruction errors serves as the class of the test sample g; and $\varsigma$ represents a class predicted for the test sample g, then:

$$\varsigma = \underset{p \in \{1, \ldots, P\}}{\arg\min} \sum_{i=S(1,p)}^{S(V,p)} \|g^i - A_p^i \alpha_p^i\|_2^2;$$

wherein $\alpha_p^k$ represents a coefficient corresponding to the $p^{th}$ class in the sparse coding coefficients $\alpha^k$ corresponding to the selected $k^{th}$ three-dimensional Gabor feature $g^k$; and the index matrix I is obtained by removing the repeated indexes from the preliminary index matrix S, then $i \in \{I(k), k=1, \ldots, K\}$.

\* \* \* \* \*